United States Patent
Lin et al.

(10) Patent No.: US 12,323,193 B2
(45) Date of Patent: Jun. 3, 2025

(54) INDOOR POSITIONING SYSTEM AND METHOD, AND COMMUNICATION-NAVIGATION INTEGRATED SYSTEM

(71) Applicants: ZHONGTIAN RADIO FREQUENCY CABLE CO., LTD., Nantong (CN); JIANGSU ZHONGTIAN TECHNOLOGY CO., LTD., Nantong (CN)

(72) Inventors: Longlong Lin, Nantong (CN); Zongming Xu, Nantong (CN); Bin Wang, Nantong (CN); Ruijing Zhao, Nantong (CN)

(73) Assignees: ZHONGTIAN RADIO FREQUENCY CABLE CO., LTD., Nantong (CN); JIANGSU ZHONGTIAN TECHNOLOGY CO., LTD., Nantong (CN)

(*) Notice: Subject to any disclaimer, the term of this patent is extended or adjusted under 35 U.S.C. 154(b) by 357 days.

(21) Appl. No.: 17/947,077

(22) Filed: Sep. 16, 2022

(65) Prior Publication Data
US 2023/0012446 A1    Jan. 12, 2023

Related U.S. Application Data

(63) Continuation of application No. PCT/CN2022/078674, filed on Mar. 1, 2022.

(30) Foreign Application Priority Data

Mar. 29, 2021 (CN) .......................... 202110336753.X (51) Int. Cl.
*H04B 17/27* (2015.01)
*G01C 21/20* (2006.01)
(Continued)

(52) U.S. Cl.
CPC ........... *H04B 17/27* (2015.01); *G01C 21/206* (2013.01); *H01Q 19/30* (2013.01); *H04B 17/104* (2015.01); *H04W 64/003* (2013.01)

(58) Field of Classification Search
None
See application file for complete search history.

(56) References Cited

U.S. PATENT DOCUMENTS

2004/0219930 A1* 11/2004 Lin ...................... H04W 64/00
455/456.1
2007/0010279 A1* 1/2007 Matsushita ............ H01Q 1/246
455/523

(Continued)

FOREIGN PATENT DOCUMENTS

CN    102395222 A    3/2012
CN    102438203 A    5/2012
(Continued)

OTHER PUBLICATIONS

Extended European Search Report of the parallel application EP22765735.0.

(Continued)

*Primary Examiner* — Adolf Dsouza
(74) *Attorney, Agent, or Firm* — J.C. PATENTS (57) ABSTRACT

An indoor positioning system includes an information source module, a gateway, a first leaky cable and a first positioning device; where the information source module is connected to a first end of the first leaky cable through a feeder; the first positioning device is arranged between the first end of the first leaky cable and the feeder, and the first positioning device is configured to transmit a positioning signal through the first leaky cable, so as to enable the terminal to perform positioning according to the positioning signal. There is no need to set up a new positioning system, (Continued)

thus reducing costs for network construction as well as space requirements for the network construction.

16 Claims, 4 Drawing Sheets

(51) Int. Cl.
*H01Q 19/30* (2006.01)
*H04B 17/10* (2015.01)
*H04W 64/00* (2009.01)

(56) References Cited

U.S. PATENT DOCUMENTS

| 2014/0171113 | A1 | 6/2014 | Christmann |
|---|---|---|---|
| 2020/0303829 | A1 | 9/2020 | Scheucher |

FOREIGN PATENT DOCUMENTS

| CN | 102883272 | A | 1/2013 |
|---|---|---|---|
| CN | 103383447 | A | 11/2013 |
| CN | 104064998 | A | 9/2014 |
| CN | 107656268 | A | 2/2018 |
| CN | 108289276 | A | 7/2018 |
| CN | 208210309 | U | 12/2018 |
| CN | 109474935 | A | 3/2019 |
| CN | 111432330 | A | 7/2020 |
| CN | 111432363 | A | 7/2020 |
| CN | 111856396 | A | 10/2020 |
| CN | 113068120 | A | 7/2021 |
| JP | 2009053099 | A | 3/2009 |
| WO | WO2010123655 | A1 | 10/2010 |
| WO | WO2017096489 | A1 | 6/2017 |
| WO | WO-2021179766 | A1 * | 9/2021 ............. H04W 4/02 |

OTHER PUBLICATIONS

NPL: "Two dimensional position detection method using bi-directional leaky coaxial cable based on TDOA".
NPL: "Two dimensional position detection method using bi-directional leaky coaxial cable based on TDOA", IEEE 20th International Symposium on Personal, Indoor and Mobile Radio Communications (PIMRC 20090, IEEE, Psicataway, NJ, USA, Sep. 13, 2009, pp. 2167-2170, XP031659957, ISBN: 978-1-4244-5122-7.
First Office Action of the priority application CN202110336753.X.
Notice of Allowance of the priority application CN202110336753.X.
International Search Report of PCT/CN2022/078674.
NPL1: "Study of deep coverage strategies in residential communities" Author: Chao Wang; Yue Li; Xiuqing AI Publisher: <Telecommunications Technology> Issue 12 Publication Date: Dec. 25, 2013 URL:https://kns.cnki.net/kcms/detail/detail.aspx?dbcode=CJFD&dbname=CJFDHIS2.
NPL2: "Experience of GSM-R project construction on the Hopewell passenger line" Author: Wenhong Ren Publisher: <China Railways> Issue 09. Publication Date: Sep. 15, 2008 URL:https://kns.cnki.net/kcms/detail/detail.aspx?dbcode=CJFD&dbname=CJFD2008.
NPL3: "Report On the Compatibility Between GSM Equipment on Board Aircraft and Terrestrial Networks" Author: SE7 Publisher: 3GPP Publication Dte: Nov. 4, 2005.

* cited by examiner

INDOOR POSITIONING SYSTEM AND METHOD, AND COMMUNICATION-NAVIGATION INTEGRATED SYSTEM

CROSS-REFERENCE TO RELATED APPLICATIONS

The present application is a continuation of International Application No. PCT/CN2022/078674, filed on Mar. 1, 2022, which claims priority to Chinese Patent Application No. 202110336753.X, filed on Mar. 29, 2021. The disclosures of the aforementioned applications are hereby incorporated by reference in their entireties.

TECHNICAL FIELD

The present application relates to the technical field of communication and positioning, and in particular, to an indoor positioning system and method, and a communication-navigation integrated system.

BACKGROUND

With the development of urbanization, more and more large-scale commercial buildings, large-scale pivotal projects, tunnels, etc. appear in people's daily lives. When people move around in these indoor places, it is difficult for people to know their own positions quickly due to factors such as large area and complex spatial layout of these places. Therefore, people's demand for positioning in large indoor places is becoming more and more urgent. With the development of Internet of Things technology and related hardware, indoor positioning technology has been developed rapidly.

At present, conventional indoor positioning technologies mainly include: WiFi positioning, radio frequency identification (RFID) positioning, ultra-wideband positioning, Bluetooth positioning, infrared positioning, ultrasonic positioning, inertial navigation technology, etc.

SUMMARY

An embodiment of the present application provides an indoor positioning system and method, and a communication-navigation integrated system, which greatly reduce costs for network construction and reduce space requirements for the network construction.

In a first aspect, an embodiment of the present application provides an indoor positioning system, including:
  an information source module, a first leaky cable and a first positioning device;
  where the information source module is connected to a first end of the first leaky cable through a feeder;
  the first positioning device is arranged between the first end of the first leaky cable and the feeder;
  the first positioning device is configured to transmit a positioning signal through the first leaky cable, so as to enable a terminal to perform positioning according to the positioning signal.

In a possible design of the first aspect, the indoor positioning system further includes a gateway and a combiner;
  the information source module and the gateway are respectively connected to an input end of the combiner, and an output end of the combiner is connected to the first end of the first leaky cable through the feeder;
  the first positioning device is configured to receive a configuration signal transmitted by the gateway or transmit the positioning signal to the gateway.

In a possible design of the first aspect, the indoor positioning system further includes: a second positioning device; the second positioning device is arranged at a second end of the first leaky cable and receives power supply from the gateway or the information source module; the second positioning device is configured to receive the configuration signal transmitted by the gateway or transmit the positioning signal to the gateway, and transmit the positioning signal through the first leaky cable, so as to enable the terminal to perform positioning according to the positioning signal.

In a second aspect, an embodiment of the present application provides an indoor positioning method, which adopts the indoor positioning system as described in the first aspect or any possible designs thereof, and includes:
  step A1: obtaining a known parameter, including: determining a straight radial distance x from the terminal to the first leaky cable, a first total transmission time $T1$ of a first positioning signal transmitted between the first positioning device and the terminal, a propagation speed $v1$ of the first positioning signal in the first leaky cable, a propagation speed c of the first positioning signal in free space and a radiation angle $\theta1$ of the first leaky cable;
  step A2: introducing the straight radial distance x from the terminal to the first leaky cable, the first total transmission time $T1$ of the first positioning signal transmitted between the first positioning device and the terminal, the propagation speed $v1$ of the first positioning signal in the first leaky cable, the propagation speed c of the first positioning signal in the free space, and the radiation angle $\theta1$ of the first leaky cable into a first preset formula, to obtain a longitudinal distance y from the terminal to the first end of the first leaky cable along an extension direction of the first leaky cable, and to obtain a coordinate (x, y) of the terminal relative to the first leaky cable.

In a third aspect, an embodiment of the present application further provides an indoor positioning method, which adopts the indoor positioning system as described in the first aspect or any possible designs of the first aspect, and includes:
  step D1: obtaining a known parameter, including a first total transmission time $T1$ of a first positioning signal transmitted between the first positioning device and the terminal, a propagation speed $v1$ of the first positioning signal and a second positioning signal in the first leaky cable, a second total transmission time $T2$ of the second positioning signal transmitted between the second positioning device and the terminal, a propagation speed c of the first positioning signal and the second positioning signal in free space, a radiation angle $\theta1$ of the first leaky cable and a length l of the first leaky cable;
  step D2: introducing the first total transmission time $T1$ of the first positioning signal transmitted between the first positioning device and the terminal, the propagation speed $v1$ of the first positioning signal and the second positioning signal in the first leaky cable, the second total transmission time $T2$ of the second positioning signal transmitted between the second positioning device and the terminal, the propagation speed c of the first positioning signal and the second positioning signal in the free space, the radiation angle $\theta1$ of the first leaky cable and the length l of the first leaky cable into a fourth preset formula, to obtain a straight radial distance x from the terminal to the first leaky cable;

step D3: introducing the radial distance x, the propagation speed v1 of the first positioning signal and the second positioning signal in the first leaky cable, the first total transmission time T1, the propagation speed c of the first positioning signal and the second positioning signal in the free space, and the radiation angle θ1 of the first leaky cable into a first preset formula, to obtain a longitudinal distance y from the terminal to the first end of the first leaky cable along an extension direction of the first leaky cable, and to obtain a coordinate (x, y) of the terminal relative to the first leaky cable.

In a fourth aspect, an embodiment of the present application further provides a communication-navigation integrated system, which includes the indoor positioning system as described in the first aspect or any possible designs thereof.

According to the indoor positioning system and method, and the communication-navigation integrated system provided by the embodiments of the present application, in the indoor positioning system, on the basis of an existing indoor distribution coverage network composed of an information source module and a first leaky cable, a positioning device is arranged between the leaky cable and a feeder, and the positioning device transmits a positioning signal through the leaky cable, and an indoor positioning target is positioned through the positioning signal. Because there is no need to set up a new positioning system, and indoor terminal positioning can be realized simply by adding the positioning device on the basis of the original indoor distribution coverage network, thus greatly reducing costs for network construction as well as space requirements for the network construction.

BRIEF DESCRIPTION OF DRAWINGS

In order to more clearly explain the embodiments of the present application or the technical solutions in the prior art, in the following, the drawings that need to be used in the description of the embodiments or the prior art will be introduced briefly. Obviously, the drawings in the following description are only some embodiments of the present application. For those of ordinary skill in the art, other drawings can be obtained according to these drawings without paying any creative labor.

DESCRIPTION OF EMBODIMENTS

In order to make the purpose, technical solution and advantages of the embodiments of the present application clearer, the technical solution in the embodiments of the present application will be clearly and completely described below with reference to the drawings in the embodiments of the present application. Obviously, the described embodiments are a part of the embodiments of the present application, but not all of the embodiments. Based on the embodiments of the present application, all other embodiments obtained by ordinary skill in the art without paying creative labor shall fall within the protection scope of the present application.

At present, the existing indoor positioning technologies all need to rearrange a set of positioning networks indoors, which greatly increases the space requirement of indoor network layout, and the cost of indoor network layout is high.

In order to solve the above technical problems, there is no need to set up a new positioning system specially for the indoor positioning system proposed in the present application, instead, it is simply necessary to add a positioning device on the basis of an original indoor distribution coverage network, in this way, indoor terminal positioning is realized, thus greatly reducing costs for network construction as well as space requirements for the network construction.

Figure 1:
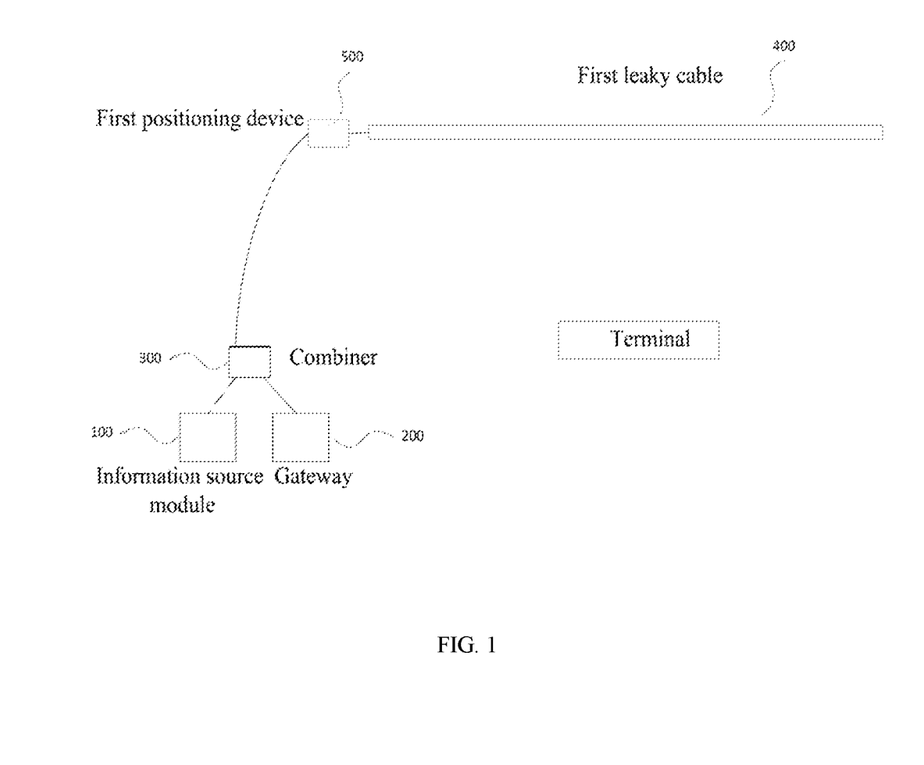
FIG. 1 is a structural schematic diagram of an indoor positioning system provided by an embodiment of the present application.

Referring to FIG. 1, FIG. 1 is a structural schematic diagram of an indoor positioning system provided by an embodiment of the present application. The indoor positioning system provided by this embodiment includes:

an information source module 100, a first leaky cable 400 and a first positioning device 500;

where the information source module 100 is connected to a first end of the first leaky cable 400 through a feeder;

the first positioning device 500 is arranged between the first end of the first leaky cable 400 and the feeder;

the first positioning device 500 is configured to transmit a positioning signal through the first leaky cable 400, so as to enable a terminal to perform positioning according to the positioning signal.

In this indoor positioning system, on the basis of an existing indoor distribution coverage network composed of the information source module and first leaky cable, the positioning device is arranged between the leaky cable and the feeder, and the positioning device transmits a positioning signal through the leaky cable, and an indoor positioning target is positioned through the positioning signal. Because there is no need to set up a new positioning system, and indoor terminal positioning can be realized simply by adding the positioning device on the basis of the original indoor distribution coverage network, thus greatly reducing costs for network construction as well as space requirements for the network construction.

Specifically, an embodiment of a specific indoor positioning system includes an information source module 100, a gateway 200, a combiner 300, a first leaky cable 400 and a first positioning device 500.

The information source module 100 and the gateway 200 are respectively connected to an input end of the combiner 300, and an output end of the combiner 300 is connected to a first end of the first leaky cable 400 through a feeder.

The first positioning device 500 is arranged between the first end of the first leaky cable 400 and the feeder.

The first positioning device 500 is configured to receive a configuration signal transmitted by the gateway 200 or transmit a positioning signal to the gateway 200, and transmit the positioning signal through the first leaky cable 400, so as to enable a terminal to perform positioning according to the positioning signal.

In this embodiment, the gateway 200 is configured to provide a power source for and configure the first positioning device 500 and the first leaky cable 400, so that the first positioning device 500 outputs the positioning signal.

In this embodiment, the gateway 200 is also called an internet connector or a protocol converter. The gateway 200 is configured to interconnect two networks with different high-level protocols in the indoor distribution coverage network. The gateway 200 can be used for both WAN interconnection and LAN interconnection. Meanwhile, the gateway 200 in this embodiment is also configured to supply direct current power to devices such as the first leaky cable 400 and the first positioning device 500.

In this embodiment, the first leaky cable 400 may be a MIMO (Multiple In Multiple Out) leaky cable.

In this embodiment, the first positioning device 500 includes at least one positioning base station for transmitting the positioning signal.

From the above description, it can be seen that on the basis of the existing indoor distribution coverage network composed of the information source module, gateway, combiner and first leaky cable, the positioning device is arranged between the leaky cable and the feeder, and the positioning device is configured by the gateway, receives and transmits the positioning signal through the leaky cable, and performs positioning of the indoor terminal through the positioning signal. Because there is no need to set up a new positioning system, and indoor terminal positioning can be realized simply by adding the positioning device on the basis of the original indoor distribution coverage network, thus greatly reducing costs for network construction as well as space requirements for the network construction.

In an embodiment of the present application, the gateway 200 is configured to supply direct current power supply to the first leaky cable 400 and the first positioning device 500. The first positioning device 500 is a direct current device, and the first leaky cable 400 is a cable powered by direct current. The direct current of the gateway 200 is the power source in the communication network, and a magnitude of its power supply voltage can be set according to needs of the network.

In another embodiment of the present application, the first leaky cable 400 and the first positioning device 500 receive direct current power supply or radio frequency power supply from the gateway 200.

In yet another embodiment of the present application, the first leaky cable 400 and the first positioning device 500 receive radio frequency power supply from the information source module 100.

As the direct current power supply or the radio frequency power supply of the gateway or information source module of the existing communication network is used as the power source, the power supply problem of the positioning device can be solved, and there is no need to install a matching power cord to supply power to the positioning device, which increases a wiring cost and construction complexity.

Figure 2:
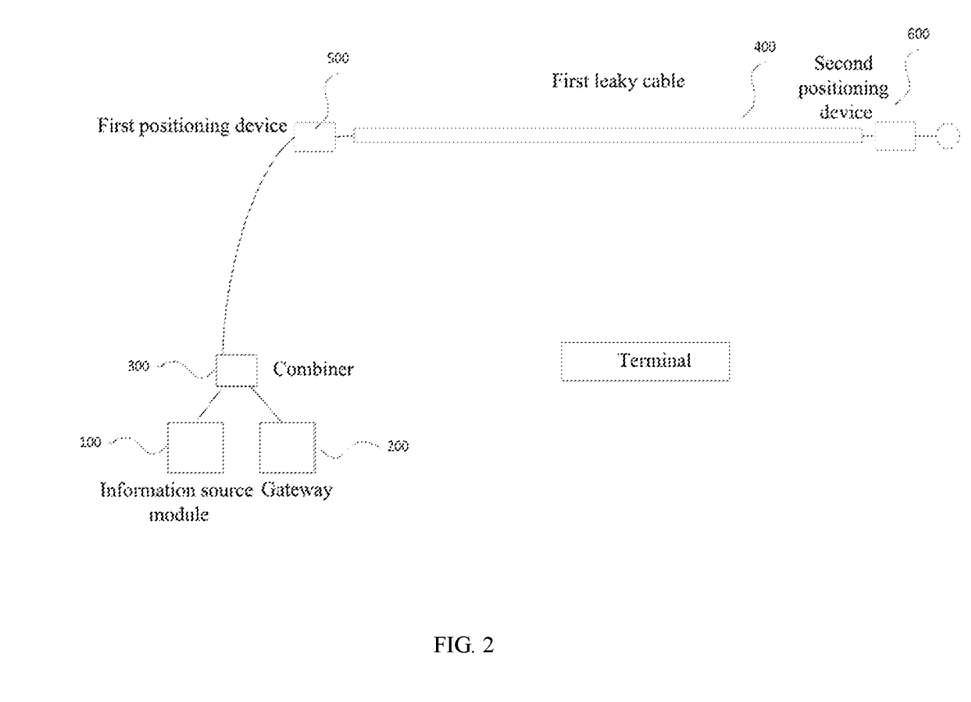
FIG. 2 is a structural schematic diagram of another indoor positioning system provided by an embodiment of the present application.

Referring to FIG. 2, FIG. 2 is a structural schematic diagram of another indoor positioning system provided by an embodiment of the present application. In one embodiment of the present application, the indoor positioning system further includes the second positioning device 600. The second positioning device 600 is arranged at a second end of the first leaky cable 400, and receives power supply from the gateway 200 or the information source module 100.

The second positioning device 600 is configured to receive a configuration signal transmitted by the gateway 200 or transmit a positioning signal to the gateway 200, and transmit the positioning signal through the first leaky cable 400, so as to enable the terminal to perform positioning according to the positioning signal.

Figure 3:
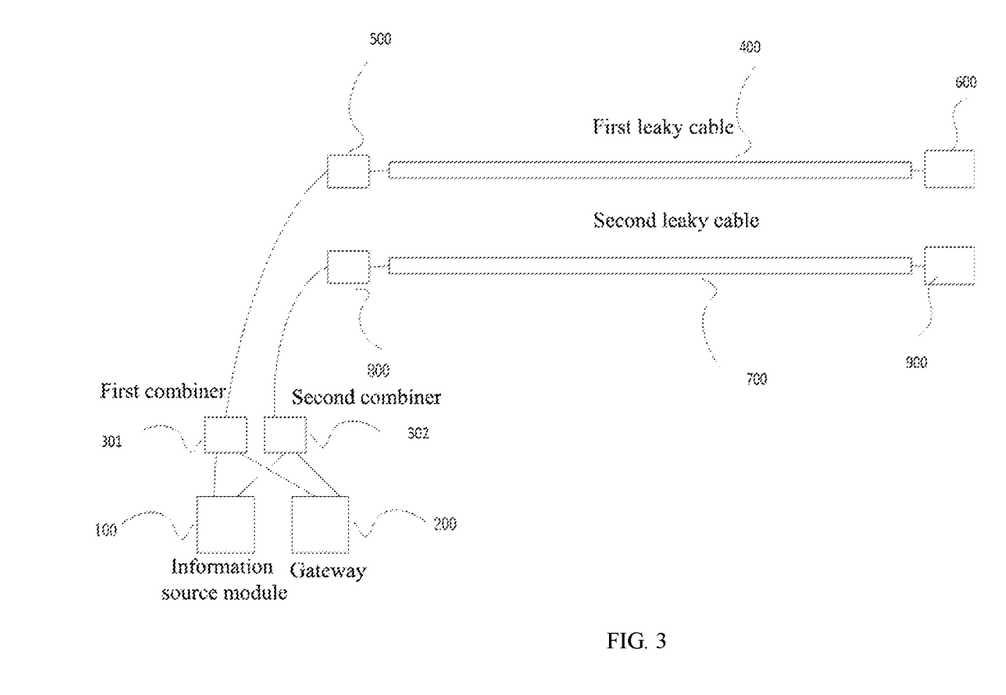
FIG. 3 is a structural schematic diagram of yet another indoor positioning system provided by an embodiment of the present application.

Referring to FIG. 3, FIG. 3 is a structural schematic diagram of another indoor positioning system provided by an embodiment of the present application. The indoor positioning system provided by this embodiment includes:
a third positioning device 800, a second leaky cable 700 and a fourth positioning device 900,
an output end of the combiner 300 is connected to a first end of the second leaky cable 700 through a feeder;
the third positioning device 800 is arranged between the first end of the second leaky cable 700 and the feeder, and receives power supply from the gateway 200 or the information source module 100;
the fourth positioning device 900 is arranged at a second end of the second leaky cable 700, and receives power supply from the gateway 200 or the information source module 100;
the third positioning device 800 and the fourth positioning device 900 are configured to receive a configuration signal transmitted by the gateway 200 or transmit a positioning signal to the gateway 200, and transmit the positioning signal through the second leaky cable 700, so as to enable the terminal to perform positioning according to the positioning signal.

It should be noted that the combiner 300 can be one combiner or two combiners. When the combiner 300 is two combiners, the first positioning device 500 and the third positioning device 800 are respectively connected to one combiner.

In this embodiment, the combiner 300 may include a first combiner 301 and a second combiner 302. The first combiner 301 and the second combiner 302 are both connected to the information source module 100 and the gateway 200, and the first positioning device 500 and the third positioning device 800 are respectively connected to the first combiner 301 and the second combiner 302.

In an embodiment of the present application, the first positioning device 500, the second positioning device 600, the third positioning device 800 and the fourth positioning device 900 include at least one positioning base station. The first positioning device 500, the second positioning device 600, the third positioning device 800 and the fourth positioning device 900 further include one or more of the following devices: a power divider, a coupler, a filter, a combiner, an antenna, a circulator, an isolator, a load and an attenuator; when the first positioning device 500 and the second positioning device 600 include the antenna or are integrated with a function of an antenna, the first positioning device 500 and the second positioning device 600 are capable of transmitting or receiving the positioning signal through the antenna.

Direct current can pass through the power divider and the coupler.

Figure 4:
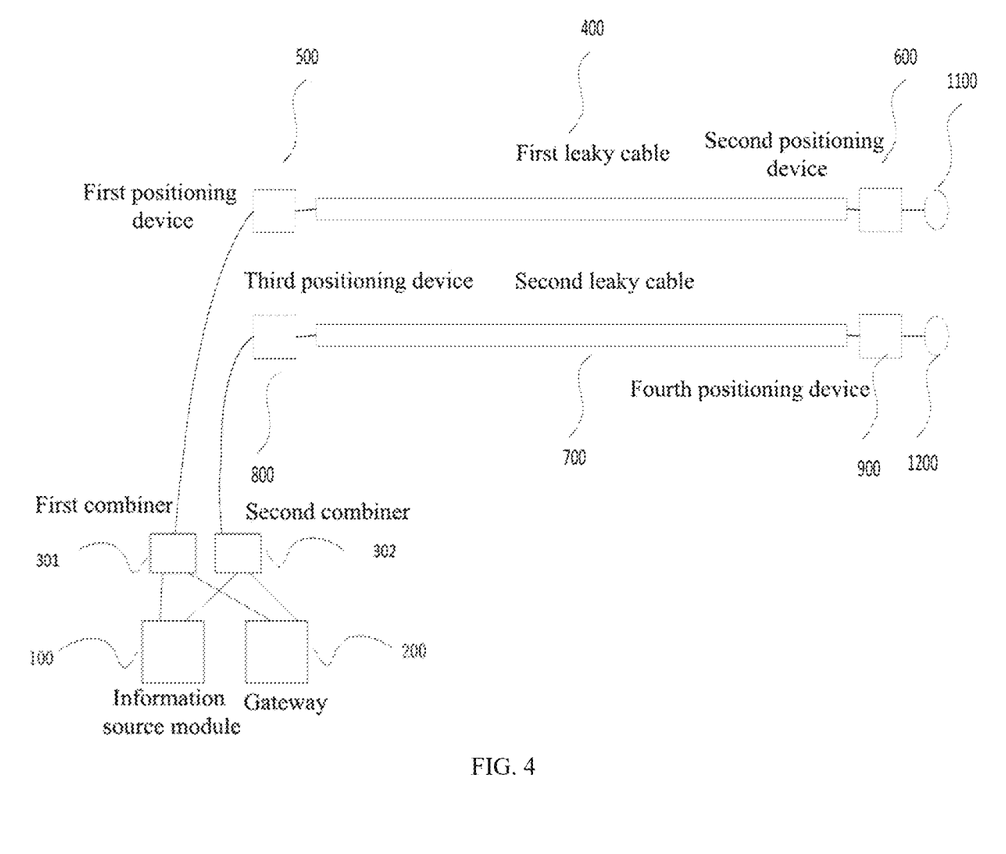
FIG. 4 is a structural schematic diagram of yet another indoor positioning system provided by an embodiment of the present application.

Referring to FIG. 4, in one or more embodiments of the present application, a positioning signal is transmitted or received through an antenna in the first positioning device 500, the second positioning device 600, the third positioning device 800 and the fourth positioning device 900.

The first positioning device 500 and the second positioning device 600 transmit or receive the positioning signal through a first antenna 1100; the third positioning device 800 and the fourth positioning device 900 transmit or receive the positioning signal through a second antenna 1200. On the basis of transmitting or receiving the positioning signal through the leaky cable, further transmission or receipt of the positioning signal through the antenna ensures signal strength and sensitivity, and provides accuracy for positioning.

In one or more embodiments of the present application, the positioning base station includes one or more of a Bluetooth module, an ultra-wideband (UWB) module, a radio frequency identification (RFID) module, a wireless local area network WiFi module, and a ZigBee module.

In one or more embodiments of the present application, an indoor positioning method is further provided, which adopts the indoor positioning system as described in the above, and the method includes:

after the first positioning device and/or the second positioning device transmit a positioning signal, and perform positioning signal interaction with the terminal through the first leaky cable for one or more times, the terminal calculating a position of the terminal according to the interacted positioning signal; or, after the first positioning device and/or the second positioning device transmit the interacted positioning signal to a positioning server, the positioning server calculating the position of the terminal according to the interacted positioning signal;

or, after the terminal transmits the positioning signal, and performs the positioning signal interaction with the first positioning device and/or the second positioning device through the first leaky cable for one or more times, the terminal calculating the position of the terminal according to the interacted positioning signal; or, after the first positioning device and/or the second positioning device transmit the interacted positioning signal to the positioning server through the gateway, the positioning server calculating the position of the terminal according to the interacted positioning signal.

In a possible implementation, the positioning signal interacted between the first positioning device and the terminal is a first positioning signal; the indoor positioning method is applied to the embodiment shown in FIG. 1, and the executing subject is a terminal or a positioning server, and the indoor positioning method includes:

step A1: obtaining a known parameter, including: determining a straight radial distance x from the terminal to the first leaky cable, a first total transmission time T1 of a first positioning signal transmitted between the first positioning device and the terminal, a propagation speed v1 of the first positioning signal in the first leaky cable, a propagation speed c of the first positioning signal in free space and a radiation angle θ1 of the first leaky cable.

In this step, the known parameter is obtained by a time-of-flight or time-of-arrival based positioning mode.

Step A2: introducing the straight radial distance x from the terminal to the first leaky cable, the first total transmission time T1 of the first positioning signal transmitted between the first positioning device and the terminal, the propagation speed v1 of the first positioning signal in the first leaky cable, the propagation speed c of the first positioning signal in the free space, and the radiation angle θ1 of the first leaky cable into a first preset formula, to obtain a longitudinal distance y from the terminal to the first end of the first leaky cable along an extension direction of the first leaky cable, and to obtain a coordinate (x, y) of the terminal relative to the first leaky cable.

In this step, the first preset formula is shown as the following formula (1):

$$y = v1 \cdot \left(T1 - \frac{x}{c \cdot \sin\theta 1}\right) + \frac{x}{\tan\theta 1} \quad (1)$$

In this embodiment, the radial distance x from the terminal to the first leaky cable refers to a shortest vertical distance from the terminal to the first leaky cable.

The radiation angle of the leaky cable refers to an angle between a radiation direction of a signal in the leaky cable and a longitudinal direction of the leaky cable. When the radiation angle is 90 degrees, $$\frac{1}{\tan\theta 1}$$

approaches to 0.

The propagation speed c of the positioning signal in the air refers to a propagation speed of the positioning signal in the space between the terminal and the leaky cable.

In this embodiment, the longitudinal distance y from the terminal to the first leaky cable refers to a distance from the terminal to the first end of the first leaky cable near the positioning device along the extension direction of the first leaky cable.

Further, the indoor positioning method is applied to the terminal or the positioning server as described in the above, and includes:

step B1: obtaining a known parameter, including: determining a straight radial distance x from a terminal to a first leaky cable, a first phase ψ1 of a first positioning signal when being transmitted between the terminal and the first positioning device, a wavelength $\lambda_c$ of the first positioning signal in the first leaky cable, a wavelength λ of the first positioning signal in free space and a radiation angle θ1 of the first leaky cable.

In this embodiment, the known parameter is obtained by a signal phase based positioning mode.

Step B2: introducing the straight radial distance x from the terminal to the first leaky cable, the first phase ψ1 of the first positioning signal when being transmitted between the first positioning device and the terminal, the wavelength $\lambda_c$ of the first positioning signal in the first leaky cable, the wavelength λ of the first positioning signal in the free space, and the radiation angle θ1 of the first leaky cable into a second preset formula, to obtain a longitudinal distance y from the terminal to the first end of the first leaky cable along an extension direction of the first leaky cable, and to obtain a coordinate (x, y) of the terminal relative to the first leaky cable.

The second preset formula is shown as the following formula (2):

$$y = \frac{\lambda_c}{2\pi} \cdot \left(\psi 1 - \frac{2\pi \cdot x}{\lambda \cdot \sin\theta 1}\right) + \frac{x}{\tan\theta 1} \quad (2)$$

Further, the indoor positioning method is applied to the terminal or the positioning server as described in the above, and includes:

step C1: obtaining a known parameter, including: determining a straight radial distance x from the terminal to the first leaky cable, a first total signal loss L1 of a first positioning signal transmitted between the first positioning device and the terminal, a transmission loss factor $\alpha_1$ of the first leaky cable, a coupling loss $\alpha_{c1}$ and a distance value m of the first leaky cable at m-th meter, a spatial loss factor α of the first positioning signal in free space, and a radiation angle θ1 of the first leaky cable.

In this embodiment, the known parameter is obtained by a signal strength based positioning mode.

Step C2: introducing the straight radial distance x from the terminal to the first leaky cable, the first total signal loss L1 of the first positioning signal transmitted between the first positioning device and the terminal, the transmission loss factor $\alpha_1$ of the first leaky cable, the coupling loss $\alpha_{c1}$ and the distance value m of the first leaky cable at the m-th meter, the spatial loss factor $\alpha$ of the first positioning signal in the free space and the radiation angle $\theta1$ of the first leaky cable into a third preset formula, to obtain a longitudinal distance y from the terminal to the first end of the first leaky cable along an extension direction of the first leaky cable, and to obtain a coordinate (x, y) of the terminal relative to the first leaky cable.

The third preset formula is shown as the following formula (3):

$$y = \frac{L1 - [\alpha(x-m) + \alpha_{c1}]}{\alpha_1} + \frac{x}{\tan\theta1} \quad (3)$$

In a possible implementation, the positioning signal interacted between the first positioning device and the terminal is a first positioning signal, and the positioning signal interacted between the second positioning device and the terminal is a second positioning signal; the indoor positioning method is applied to the embodiment shown in FIG. 2 as described in the above, and the executing subject is a terminal or a positioning server, and the indoor positioning method includes:

step D1: obtaining a known parameter, including: a first total transmission time T1 of a first positioning signal transmitted between the first positioning device and the terminal, a propagation speed v1 of the first positioning signal and a second positioning signal in the first leaky cable, a second total transmission time T2 of the second positioning signal transmitted between the second positioning device and the terminal, a propagation speed c of the first positioning signal and the second positioning signal in free space, a radiation angle $\theta1$ of the first leaky cable and a length l of the first leaky cable.

In this step, the known parameter is obtained by a time-of-flight or time-of-arrival based positioning mode.

Step D2: introducing the first total transmission time T1 of the first positioning signal transmitted between the first positioning device and the terminal, the propagation speed v1 of the first positioning signal and the second positioning signal in the first leaky cable, the second total transmission time T2 of the second positioning signal transmitted between the second positioning device and the terminal, the propagation speed c of the first positioning signal and the second positioning signal in the free space, the radiation angle $\theta1$ of the first leaky cable and the length l of the first leaky cable into a fourth preset formula, to obtain a straight radial distance x from the terminal to the first leaky cable.

The fourth preset formula is shown as the following formula (4):

$$v1 \cdot \left(T1 + T2 - 2\frac{x}{c \cdot \sin\theta1}\right) + 2\frac{x}{\tan\theta1} = l \quad (4)$$

Step D3: introducing the radial distance x, the propagation speed v1 of the first positioning signal and the second positioning signal in the first leaky cable, the first total transmission time T1, the propagation speed c of the first positioning signal and the second positioning signal in the free space, and the radiation angle $\theta1$ of the first leaky cable into a first preset formula, to obtain a longitudinal distance y from the terminal to the first end of the first leaky cable along an extension direction of the first leaky cable, and to obtain a coordinate (x, y) of the terminal relative to the first leaky cable.

In this step, the first preset formula is shown as the following formula (1):

$$y = v1 \cdot \left(T1 - \frac{x}{c \cdot \sin\theta1}\right) + \frac{x}{\tan\theta1} \quad (1)$$

Further, the indoor positioning method is applied to the terminal or the positioning server as described in the above, and includes:

step E1: obtaining a known parameter, including a first total transmission time T1 of a first positioning signal transmitted between the first positioning device and the terminal, and a second total transmission time T2 of a second positioning signal transmitted between the second positioning device and the terminal; a total transmission time difference $\Delta T$ is a difference between the first total transmission time T1 and the second total transmission time T2; a propagation speed v1 of the first positioning signal and the second positioning signal in the first leaky cable, a propagation speed c of the first positioning signal and the second positioning signal in free space, a radiation angle $\theta1$ of the first leaky cable, and a length l of the first leaky cable.

In this step, the known parameter is obtained by a time-of-flight or time-of-arrival based positioning mode, the known parameter including: the first total transmission time T1 of the first positioning signal transmitted between the first positioning device and the terminal, and the second total transmission time T2 of the second positioning signal transmitted between the second positioning device and the terminal; and then the total transmission time difference $\Delta T$ is obtained according to the difference between the first total transmission time T1 and the second total transmission time T2.

Or, the total transmission time difference $\Delta T$ is directly obtained by a time-of-arrival difference based positioning mode.

Step E2: introducing the propagation speed v1 of the first positioning signal and the second positioning signal in the first leaky cable, the length l of the first leaky cable, and the total transmission time difference $\Delta T$ into a fifth preset formula, to obtain a longitudinal distance y from the terminal to the first end of the first leaky cable along an extension direction of the first leaky cable.

The fifth preset formula is shown as the following formula (5):

$$\frac{2y - l}{v1} = \Delta T \quad (5)$$

Step E3: calculating a straight radial distance x from the terminal to the first leaky cable, and to obtain a coordinate (x, y) of the terminal relative to the first leaky cable.

Specifically, a specific algorithm of step E3 includes:
introducing the longitudinal distance y, the propagation speed v1 of the first positioning signal and the second positioning signal in the first leaky cable, the first total transmission time T1, the propagation speed c of the first positioning signal and the second positioning signal in the free space, and the radiation angle θ1 of the first leaky cable into a first preset formula, to obtain the straight radial distance x from the terminal to the first leaky cable, and to obtain the coordinate (x, y) of the terminal relative to the first leaky cable.

In this step, the first preset formula shown as the following formula (1):

$$y = v1 \cdot \left(T1 - \frac{x}{c \cdot \sin\theta 1}\right) + \frac{x}{\tan\theta 1} \quad (1)$$

It should be noted that other calculation algorithms can also be adopted in step E3, which are all included in the scope of protection of the present application, and will not be repeated here.

Further, the indoor positioning method is applied to the terminal or the positioning server as described above, and includes:

step F1: obtaining a known parameter, including a first phase $\psi 1$ of a first positioning signal when the terminal interacts with the first positioning device and a second phase $\psi 2$ of a second positioning signal when the terminal interacts with the second positioning device; a wavelength $\lambda_c$ of the first positioning signal and the second positioning signal in the first leaky cable, a wavelength $\lambda$ of the first positioning signal and the second positioning signal in free space, a radiation angle θ1 of the first leaky cable and a length l of the first leaky cable.

In this step, the known parameter is obtained by a phase based positioning mode.

Step F2: introducing the first phase $\psi 1$ of the first positioning signal when the terminal interacts with the first positioning device, the second phase $\psi 2$ of the second positioning signal when the terminal interacts with the second positioning device; the wavelength $\lambda_c$ of the first positioning signal and the second positioning signal in the first leaky cable, the wavelength $\lambda$ of the first positioning signal and the second positioning signal in the free space, the radiation angle θ1 of the first leaky cable and the length l of the first leaky cable into a sixth preset formula, to obtain a straight radial distance x from the terminal to the first leaky cable.

The sixth preset formula is shown as the following formula (6):

$$\frac{\lambda_c}{2\pi} \cdot \left(\psi 1 + \psi 2 - 2\frac{2\pi \cdot x}{\lambda \cdot \sin\theta 1}\right) + 2\frac{x}{\tan\theta 1} = l \quad (6)$$

Step F3: introducing the radial distance x, the wavelength $\lambda_c$ of the first positioning signal and the second positioning signal in the first leaky cable, the first phase $\psi 1$ of the first positioning signal when the terminal interacts with the first positioning device, the wavelength $\lambda$ of the first positioning signal and the second positioning signal in the free space, and the radiation angle θ1 of the first leaky cable into a second preset formula, to obtain a longitudinal distance y from the terminal to the first leaky cable, and to obtain a coordinate (x, y) of the terminal relative to the first leaky cable.

The second preset formula is shown as the following formula (2):

$$y = \frac{\lambda_c}{2\pi} \cdot \left(\psi 1 - \frac{2\pi \cdot x}{\lambda \cdot \sin\theta 1}\right) + \frac{x}{\tan\theta 1} \quad (2)$$

Further, the indoor positioning method is applied to the terminal or the positioning server as described above, and includes:

step G1: obtaining a known parameter, including a first phase $\psi 1$ of a first positioning signal when the terminal interacts with the first positioning device and a second phase $\psi 2$ of a second positioning signal when the terminal interacts with the second positioning device; a total phase difference $\Delta\psi$ between a first positioning signal when the terminal interacts with the first positioning device and a second positioning signal when the terminal interacts with the second positioning device; a wavelength $\lambda_c$ of the first positioning signal and the second positioning signal in the first leaky cable, a wavelength $\lambda$ of the first positioning signal and the second positioning signal in free space, a radiation angle θ1 of the first leaky cable and a length l of the first leaky cable.

In this step, the known parameter is obtained by a phase based positioning mode, the known parameter including: the first phase $\psi 1$ of the first positioning signal when the terminal interacts with the first positioning device, the second phase $\psi 2$ of the second positioning signal when the terminal interacts with the second positioning device, the total phase difference $\Delta\psi$ between the first positioning signal when the terminal interacts with the first positioning device and the second positioning signal when the terminal interacts with the second positioning device.

Or, the total phase difference ΔT is directly obtained by a phase difference based positioning mode.

Step G2: introducing the total phase difference $\Delta\psi$, the wavelength $\lambda_c$ of the first positioning signal and the second positioning signal in the first leaky cable, and the length l of the first leaky cable into a seventh preset formula, to obtain a longitudinal distance y from the terminal to the first end of the first leaky cable along an extension direction of the first leaky cable.

The seventh preset formula is shown as the following formula (7):

$$\frac{(2y-1) \cdot 2\pi}{\lambda_c} = \Delta\psi \quad (7)$$

Step G3: calculating a straight radial distance x from the terminal to the first leaky cable, and to obtain a coordinate (x, y) of the terminal relative to the first leaky cable.

Where a specific algorithm of this step includes:

introducing the longitudinal distance y, the wavelength $\lambda_c$ of the first positioning signal and the second positioning signal in the first leaky cable, the first phase $\psi 1$ of the first positioning signal when the terminal interacts with the first positioning device, the wavelength $\lambda$ of the first positioning signal and the second positioning signal in the free space, the radiation angle θ1 of the first leaky cable into a second preset formula, to obtain the straight radial distance x from the terminal to the first leaky cable, and to obtain a coordinate (x, y) of the terminal relative to the first leaky cable.

The second preset formula is shown as the following formula (2):

$$y = \frac{\lambda_c}{2\pi} \cdot \left(\psi 1 - \frac{2\pi \cdot x}{\lambda \cdot \sin\theta 1}\right) + \frac{x}{\tan\theta 1} \quad (2)$$

It should be noted that other calculation algorithms can also be adopted in step G3, which are all included in the scope of protection of the present application, and will not be repeated here.

Further, the indoor positioning method is applied to the terminal or the positioning server as described above, and includes:

step H1: obtaining a known parameter, including a first total loss L1 of a first positioning signal transmitted between the first positioning device and the terminal, a second total loss L2 of a second positioning signal transmitted between the second positioning device and the terminal, a transmission loss factor $\alpha_1$ of the first leaky cable, a coupling loss $\alpha_{c1}$ and a distance value m of the first leaky cable at m-th meter, a spatial loss factor $\alpha$ of the first positioning signal and the second positioning signal in free space, a radiation angle $\theta 1$ of the first leaky cable, and a length l of the first leaky cable.

In this step, the known parameter is obtained by a signal field strength based positioning mode.

Step H2: introducing the first total loss L1 of the first positioning signal transmitted between the first positioning device and the terminal, the second total loss L2 of the second positioning signal transmitted between the second positioning device and the terminal, the transmission loss factor $\alpha_1$ of the first leaky cable, the coupling loss $\alpha_{c1}$ and the distance value m of the first leaky cable at the m-th meter, the space loss factor $\alpha$ of the first positioning signal and the second positioning signal in the free space, the radiation angle $\theta 1$ of the first leaky cable and the length l of the first leaky cable into an eighth preset formula, to obtain a straight radial distance x from the terminal to the first leaky cable.

The eighth preset formula is shown as the following formula (8):

$$\frac{L1 - [a(x-m) + \alpha_{c1}]}{\alpha_1} + \frac{L2 - [a(x-m) + \alpha_{c1}]}{\alpha_1} + 2\frac{x}{\tan\theta 1} = l \quad (8)$$

Step H3: introducing the straight radial distance x from the terminal to the first leaky cable, the first total loss L1, the space loss factor $\alpha$ of the first positioning signal and the second positioning signal in the free space, the radiation angle $\theta 1$ of the first leaky cable, the coupling loss $\alpha_{c1}$ and the distance value m of the first leaky cable at the m-th meter, and the transmission loss factor $\alpha_1$ of the first leaky cable into a third preset formula, to obtain a longitudinal distance y from the terminal to the first end of the first leaky cable along an extension direction of the first leaky cable, to obtain a coordinate (x, y) of the terminal relative to the first leaky cable.

The third preset formula is shown as the following formula (3):

$$y = \frac{L1 - [a(x-m) + \alpha_{c1}]}{\alpha_1} + \frac{x}{\tan\theta 1} \quad (3)$$

Further, the indoor positioning method is applied to the terminal or the positioning server as described as above, and includes:

step J1: obtaining a known parameter, including a first total loss L1 of a first positioning signal transmitted between the first positioning device and the terminal and a second total loss L2 of a second positioning signal transmitted between the second positioning device and the terminal, where a total loss difference $\Delta L$ is a difference between the first total loss L1 and the second total loss L2; a transmission loss factor $\alpha_1$ of the first leaky cable, a coupling loss $\alpha_{c1}$ and a distance value m of the first leaky cable at m-th meter, a space loss factor $\alpha$ of the first positioning signal and the second positioning signal in free space, a radiation angle $\theta 1$ of the first leaky cable, and a length l of the first leaky cable.

In this step, the known parameter is obtained by a signal strength based positioning mode, the known parameter including: the first total loss L1 of the first positioning signal transmitted between the first positioning device and the terminal, and the second total loss L2 of the second positioning signal transmitted between the second positioning device and the terminal, where the total loss difference $\Delta L$ is the difference between the first total loss L1 and the second total loss L2.

Or, the total loss difference $\Delta L$ is directly obtained by a signal strength difference based positioning mode.

Step J2: introducing the transmission loss factor $\alpha_1$ of the first leaky cable, the length l of the first leaky cable and the total loss difference $\Delta L$ into a ninth preset formula, to obtain a longitudinal distance y from the terminal to the first end of the first leaky cable along an extension direction of the first leaky cable.

The ninth preset formula is shown as the following formula (9):

$$\alpha_1 y - \alpha_1 (l-y) = \alpha_1 (2y-l) = \Delta L \quad (9)$$

Step J3: calculating a straight radial distance x from the terminal to the first leaky cable, and to obtain a coordinate (x, y) of the terminal relative to the first leaky cable.

A specific algorithm in this step includes:
introducing the first total loss L1, the spatial loss factor $\alpha$ of the first positioning signal and the second positioning signal in the free space, the longitudinal distance y from the terminal to the first end of the first leaky cable along an extension direction of the first leaky cable, the radiation angle $\theta 1$ of the first leaky cable, the coupling loss $\alpha_{c1}$ and the distance value m of the first leaky cable at the m-th meter, and the transmission loss factor $\alpha_1$ of the first leaky cable into a third preset formula, to obtain the straight radial distance x from the terminal to the first leaky cable, and the coordinate (x, y) of the terminal relative to the first leaky cable.

The third preset formula is shown as the following formula (3):

$$y = \frac{L1 - [a(x-m) + \alpha_{c1}]}{\alpha_1} + \frac{x}{\tan\theta 1} \quad (3)$$

It should be noted that the same calculation algorithm as that of step C2 can be adopted in step J3, and other calculation algorithms can also be adopted, all of which are included in the scope of protection of the present application, and will not be repeated here.

In the present application, when the radiation angle of the leaky cable is 90°, sin θ1=1, and $$\frac{1}{\tan\theta 1}$$

approaches to 0. When the radiation angle of the leaky cable is not considered, a default radiation angle of the leaky cable is 90°, at which time sin θ1=1, and $$\frac{1}{\tan\theta 1}$$

approaches to U.

In addition to the first leaky cable, the first positioning device and the second positioning device, the communication-navigation integrated system of the present application further includes other leaky cables and positioning devices, which can further improve an accuracy or realize positioning in more dimensions after spatial arrangement and combination. For example, there are a first leaky cable, a second leaky cable, a third leaky cable, as well as a first positioning device, a second positioning device, a third positioning device, a fourth positioning device, a fifth positioning device, a sixth positioning device, and the first leaky cable, the second leaky cable and the third leaky cable are parallel and no longer in the same plane, and with the time-of-flight principle, three-dimensional positioning can be realized, that is, a coordinate position (x, y, z) of the terminal can be determined.

The above positioning algorithms and calculation steps are only specific embodiments of the present application, and any simple modifications, variations and step adjustments are included in the scope of protection of the present application. The above positioning principles can be used alone or in combination.

The present application further provides a communication-navigation integrated system, including the indoor positioning systems provided by the above embodiments.

When an information source in the present application is arranged at first ends of a first leaky cable and a second leaky cable, the first leaky cable and the second leaky cable may include multiple sections of leaky cables, and each section of leaky cable may be connected by a power divider, a coupler, a positioning device or a jumper wire. When the positioning device is adopt to connect the multiple sections of leaky cables or antennas and the positioning device includes a plurality of positioning base stations, the positioning base stations in the positioning device respectively transmit or receive positioning signals through the connected multiple sections of leaky cables or antennas. In the present application, the information source can also be arranged at the first ends and the second ends of the first leaky cable and the second leaky cable simultaneously.

The communication-navigation integrated system provided by the embodiments of the present application can be applied to indoor places such as a tunnel, a large commercial building, a large hub project and the like, and is configured to provide a communication service and a positioning service at the same time. On the basis of an existing indoor distribution coverage network composed of an information source module, a combiner and a leaky cable, a gateway is arranged at the information source, and a positioning device is arranged at a first/second end of the leaky cable. The positioning device is powered by the gateway or the information source module, configured by the gateway, receives and transmits a positioning signal through the leaky cable, and an indoor positioning target is positioned through the positioning signal. Because there is no need to set up a new positioning system, and indoor terminal positioning can be realized simply by adding a positioning device on the basis of the original indoor distribution coverage network, thus greatly reducing costs for network construction as well as space requirements for the network construction.

Finally, it should be noted that the above embodiments are only used to illustrate the technical solutions of the present application, but not to limit them; although the present application has been described with reference to the foregoing embodiments in detail, those skilled in the art should understand that the technical solutions described in the foregoing embodiments can be modified, or some or all technical features thereof can be equivalently substituted; these modifications or substitutions do not make the essence of the corresponding technical solutions deviate from the scope of the technical solutions of the embodiments of the present application.

What is claimed is:

1. An indoor positioning system, comprising: a first leaky cable, a first positioning device and a second positioning device;
   the first positioning device is arranged at a first end of the first leaky cable;
   the first positioning device is configured to receive a configuration signal transmitted by a gateway or transmit a first positioning signal to the gateway, and the first positioning device is configured to transmit the first positioning signal through the first leaky cable, so as to enable a terminal to perform positioning according to the first positioning signal;
   the second positioning device is arranged at a second end of the first leaky cable;
   the second positioning device is configured to receive the configuration signal transmitted by the gateway or transmit a second positioning signal to the gateway, and the second positioning device is configured to transmit the second positioning signal through the first leaky cable, so as to enable the terminal to perform positioning according to the second positioning signal;
   the indoor positioning system further comprising: a third positioning device, a second leaky cable and a fourth positioning device,
   an output end of a combiner is connected to a first end of the second leaky cable through a feeder;
   the third positioning device is arranged between the first end of the second leaky cable and the feeder, and receives power supply from the gateway or an information source module;
   the fourth positioning device is arranged at a second end of the second leaky cable and receives power supply from the gateway or the information source module;
   the third positioning device or the fourth positioning device is configured to receive the configuration signal transmitted by the gateway or transmit a third positioning signal or a fourth positioning signal to the gateway, and transmit the third positioning signal or the fourth positioning signal through the second leaky cable, so as to enable the terminal to perform positioning according to the third positioning signal or the fourth positioning signal.

2. The indoor positioning system according to claim 1, further comprising the information source module, the gateway and the combiner;
the information source module and the gateway are respectively connected to an input end of the combiner, and the output end of the combiner is connected to the first end of the first leaky cable through the feeder;
the second positioning device receives power supply from the gateway.

3. The indoor positioning system according to claim 2, wherein the first leaky cable and the first positioning device receive direct current power supply or radio frequency power supply from the gateway; or, the first leaky cable and the first positioning device receive radio frequency power supply from the information source module.

4. An indoor positioning method, wherein the method adopts the indoor positioning system according to claim 2, and comprises:
step D1: obtaining a known parameter, comprising a first total transmission time T1 of the first positioning signal transmitted between the first positioning device and the terminal, a propagation speed v1 of the first positioning signal and the second positioning signal in the first leaky cable, a second total transmission time T2 of the second positioning signal transmitted between the second positioning device and the terminal, a propagation speed c of the first positioning signal and the second positioning signal in free space, a radiation angle θ1 of the first leaky cable and a length l of the first leaky cable;
step D2: introducing the first total transmission time T1 of the first positioning signal transmitted between the first positioning device and the terminal, the propagation speed v1 of the first positioning signal and the second positioning signal in the first leaky cable, the second total transmission time T2 of the second positioning signal transmitted between the second positioning device and the terminal, the propagation speed c of the first positioning signal and the second positioning signal in the free space, the radiation angle θ1 of the first leaky cable and the length l of the first leaky cable into a fourth preset formula, to obtain a straight radial distance x from the terminal to the first leaky cable;
step D3: introducing the radial distance x, the propagation speed v1 of the first positioning signal and the second positioning signal in the first leaky cable, the first total transmission time T1, the propagation speed c of the first positioning signal and the second positioning signal in the free space, and the radiation angle θ1 of the first leaky cable into a first preset formula, to obtain a longitudinal distance y from the terminal to the first end of the first leaky cable along an extension direction of the first leaky cable, and to obtain a coordinate (x, y) of the terminal relative to the first leaky cable.

5. The method according to claim 4, wherein the method further comprises:
step E1: obtaining a known parameter, comprising a first total transmission time T1 of the first positioning signal transmitted between the first positioning device and the terminal, and a second total transmission time T2 of the second positioning signal transmitted between the second positioning device and the terminal; a total transmission time difference ΔT is a difference between the first total transmission time T1 and the second total transmission time T2; a propagation speed v1 of the first positioning signal and the second positioning signal in the first leaky cable, a propagation speed c of the first positioning signal and the second positioning signal in free space, a radiation angle θ1 of the first leaky cable, and a length l of the first leaky cable;
step E2: introducing the propagation speed v1 of the first positioning signal and the second positioning signal in the first leaky cable, the length l of the first leaky cable, and the total transmission time difference ΔT into a fifth preset formula, to obtain a longitudinal distance y from the terminal to the first end of the first leaky cable along an extension direction of the first leaky cable;
step E3: calculating a straight radial distance x from the terminal to the first leaky cable, and to obtain a coordinate (x, y) of the terminal relative to the first leaky cable.

6. The method according to claim 4, wherein the method further comprises:
step F1: obtaining a known parameter, comprising a first phase Φ1 of the first positioning signal when the terminal interacts with the first positioning device and a second phase ψ2 of the second positioning signal when the terminal interacts with the second positioning device; a wavelength $\lambda_c$ of the first positioning signal and the second positioning signal in the first leaky cable, a wavelength l of the first positioning signal and the second positioning signal in free space, a radiation angle θ1 of the first leaky cable and a length l of the first leaky cable;
step F2: introducing the first phase ψ1 of the first positioning signal when the terminal interacts with the first positioning device, the second phase ψ2 of the second positioning signal when the terminal interacts with the second positioning device; the wavelength $\lambda_c$ of the first positioning signal and the second positioning signal in the first leaky cable, the wavelength λ of the first positioning signal and the second positioning signal in the free space, the radiation angle θ1 of the first leaky cable and the length l of the first leaky cable into a sixth preset formula, to obtain a straight radial distance x from the terminal to the first leaky cable;
step F3: introducing the radial distance x, the wavelength $\lambda_c$ of the first positioning signal and the second positioning signal in the first leaky cable, the first phase ψ1 of the first positioning signal when the terminal interacts with the first positioning device, the wavelength λ of the first positioning signal and the second positioning signal in the free space, and the radiation angle θ1 of the first leaky cable into a second preset formula, to obtain a longitudinal distance y from the terminal to the first leaky cable, and to obtain a coordinate (x, y) of the terminal relative to the first leaky cable.

7. The method according to claim 4, wherein the method further comprises:
step G1: obtaining a known parameter, comprising a first phase ψ1 of the first positioning signal when the terminal interacts with the first positioning device and a second phase ψ2 of the second positioning signal when the terminal interacts with the second positioning device; a total phase difference Δψ between the first positioning signal when the terminal interacts with the first positioning device and the second positioning signal when the terminal interacts with the second positioning device; a wavelength $\lambda_c$ of the first positioning signal and the second positioning signal in the first leaky cable, a wavelength λ of the first positioning signal and the second positioning signal in free space, a radiation angle θ1 of the first leaky cable and a length l of the first leaky cable;

step G2: introducing the total phase difference $\Delta\psi$, the wavelength $\lambda_c$ of the first positioning signal and the second positioning signal in the first leaky cable, and the length l of the first leaky cable into a seventh preset formula, to obtain a longitudinal distance y from the terminal to the first end of the first leaky cable along an extension direction of the first leaky cable;

step G3: calculating a straight radial distance x from the terminal to the first leaky cable, and to obtain a coordinate (x, y) of the terminal relative to the first leaky cable.

8. The method according to claim 4, wherein the method further comprises:

step H1: obtaining a known parameter, comprising a first total loss L1 of the first positioning signal transmitted between the first positioning device and the terminal, a second total loss L2 of the second positioning signal transmitted between the second positioning device and the terminal, a transmission loss factor $\alpha_1$ of the first leaky cable, a coupling loss $\alpha_{c1}$ and a distance value m of the first leaky cable at m-th meter, a spatial loss factor $\alpha$ of the first positioning signal and the second positioning signal in free space, a radiation angle $\theta 1$ of the first leaky cable, and a length l of the first leaky cable;

step H2: introducing the first total loss L1 of the first positioning signal transmitted between the first positioning device and the terminal, the second total loss L2 of the second positioning signal transmitted between the second positioning device and the terminal, the transmission loss factor $\alpha_1$ of the first leaky cable, the coupling loss $\alpha_{c1}$ and the distance value m of the first leaky cable at the m-th meter, the space loss factor $\alpha$ of the first positioning signal and the second positioning signal in the free space, the radiation angle $\theta 1$ of the first leaky cable and the length l of the first leaky cable into an eighth preset formula, to obtain a straight radial distance x from the terminal to the first leaky cable;

step H3: introducing the straight radial distance x from the terminal to the first leaky cable, the first total loss L1, the space loss factor $\alpha$ of the first positioning signal and the second positioning signal in the free space, the radiation angle $\theta 1$ of the first leaky cable, the coupling loss $\alpha_{c1}$ and the distance value m of the first leaky cable at the m-th meter, and the transmission loss factor $\alpha_1$ of the first leaky cable into a third preset formula, to obtain a longitudinal distance y from the terminal to the first end of the first leaky cable along an extension direction of the first leaky cable, to obtain a coordinate (x, y) of the terminal relative to the first leaky cable.

9. The method according to claim 4, wherein the method further comprises:

step J1: obtaining a known parameter, comprising a first total loss L1 of the first positioning signal transmitted between the first positioning device and the terminal and a second total loss L2 of the second positioning signal transmitted between the second positioning device and the terminal, wherein a total loss difference $\Delta L$ is a difference between the first total loss L1 and the second total loss L2; a transmission loss factor di of the first leaky cable, a coupling loss $\alpha_{c1}$ and a distance value m of the first leaky cable at m-th meter, a space loss factor $\alpha$ of the first positioning signal and the second positioning signal in free space, a radiation angle $\theta 1$ of the first leaky cable, and a length l of the first leaky cable;

step J2: introducing the transmission loss factor $\alpha_1$ of the first leaky cable, the length l of the first leaky cable and the total loss difference $\Delta L$ into a ninth preset formula, to obtain a longitudinal distance y from the terminal to the first end of the first leaky cable along an extension direction of the first leaky cable;

step J3: calculating a straight radial distance x from the terminal to the first leaky cable, and to obtain a coordinate (x, y) of the terminal relative to the first leaky cable.

10. The indoor positioning system according to claim 1, wherein the first positioning device, the second positioning device, the third positioning device and the fourth positioning device comprise at least one positioning base station.

11. The indoor positioning system according to claim 1, wherein the first positioning device, the second positioning device, the third positioning device and the fourth positioning device further comprise one or more of the following devices: a power divider, a coupler, a filter, a combiner, an antenna, a circulator, an isolator, a load and an attenuator; when the first positioning device and the second positioning device comprise the antenna or the first positioning device and the second positioning device are integrated with a function of an antenna, the first positioning device and the second positioning device are capable of transmitting or receiving the first positioning signal and the second positioning signal through the antenna.

12. The indoor positioning system according to claim 1, wherein the first positioning device, the second positioning device, the third positioning device and the fourth positioning device transmit or receive the first positioning signal, the second positioning signal, the third positioning signal and the fourth positioning signal through antennas.

13. An indoor positioning method, wherein the method adopts the indoor positioning system according to claim 1, and comprises:

step A1: obtaining a known parameter, comprising: determining a straight radial distance x from the terminal to the first leaky cable, a first total transmission time T1 of the first positioning signal transmitted between the first positioning device and the terminal, a propagation speed v1 of the first positioning signal in the first leaky cable, a propagation speed c of the first positioning signal in free space and a radiation angle $\theta 1$ of the first leaky cable;

step A2: introducing the straight radial distance x from the terminal to the first leaky cable, the first total transmission time T1 of the first positioning signal transmitted between the first positioning device and the terminal, the propagation speed v1 of the first positioning signal in the first leaky cable, the propagation speed c of the first positioning signal in the free space, and the radiation angle $\theta 1$ of the first leaky cable into a first preset formula, to obtain a longitudinal distance y from the terminal to the first end of the first leaky cable along an extension direction of the first leaky cable, and to obtain a coordinate (x, y) of the terminal relative to the first leaky cable.

14. The method according to claim 13, wherein the method further comprises:

step B1: obtaining a known parameter, comprising: determining a straight radial distance x from the terminal to the first leaky cable, a first phase $\psi 1$ of the first positioning signal transmitted between the terminal and the first positioning device, a wavelength $\lambda_c$ of the first positioning signal in the first leaky cable, a wavelength λ of the first positioning signal in free space and a radiation angle θ1 of the first leaky cable;

step B2: introducing the straight radial distance x from the terminal to the first leaky cable, the first phase ψ1 of the first positioning signal transmitted between the first positioning device and the terminal, the wavelength $\lambda_c$ of the first positioning signal in the first leaky cable, the wavelength λ of the first positioning signal in the free space, and the radiation angle θ1 of the first leaky cable into a second preset formula, to obtain a longitudinal distance y from the terminal to the first end of the first leaky cable along an extension direction of the first leaky cable, and to obtain a coordinate (x, y) of the terminal relative to the first leaky cable.

15. The method according to claim 13, wherein the method further comprises:

step C1: obtaining a known parameter, comprising: determining a straight radial distance x from the terminal to the first leaky cable, a first total signal loss L1 of the first positioning signal transmitted between the first positioning device and the terminal, a transmission loss factor $\alpha_1$ of the first leaky cable, a coupling loss $\alpha_{c1}$ and a distance value m of the first leaky cable at m-th meter, a spatial loss factor α of the first positioning signal in free space, and a radiation angle θ1 of the first leaky cable;

step C2: introducing the straight radial distance x from the terminal to the first leaky cable, the first total signal loss L1 of the first positioning signal transmitted between the first positioning device and the terminal, the transmission loss factor di of the first leaky cable, the coupling loss $\alpha_{c1}$ and the distance value m of the first leaky cable at the m-th meter, the spatial loss factor α of the first positioning signal in the free space and the radiation angle θ1 of the first leaky cable into a third preset formula, to obtain a longitudinal distance y from the terminal to the first end of the first leaky cable along an extension direction of the first leaky cable, and to obtain a coordinate (x, y) of the terminal relative to the first leaky cable.

16. A communication-navigation integrated system, comprising the indoor positioning system according to claim 1.

* * * * *